May 8, 1962 R. P. SNODGRASS 3,033,035
COMPOUND AIRCRAFT INSTRUMENT
Filed Aug. 10, 1956 2 Sheets-Sheet 1

INVENTOR
REUBEN P. SNODGRASS
BY
Arthur H. Serrell
ATTORNEY

INVENTOR
REUBEN P. SNODGRASS
BY
Arthur H. Serrell
ATTORNEY 3,033,035
COMPOUND AIRCRAFT INSTRUMENT
Reuben P. Snodgrass, Lake Ronkonkoma, N.Y., assignor to Sperry Rand Corporation, a corporation of Delaware
Filed Aug. 10, 1956, Ser. No. 603,387
8 Claims. (Cl. 73—178)

This invention relates to a compound aircraft instrument providing equivalent speed or dynamic pressure indication as well as stall warning indication. The improved instrument constitutes a computer whose variable factor inputs may be mechanically introduced by the human pilot or effected automatically to present an accurate visual output that enables the human pilot to pilot the craft safely in both straight and level flight and in maneuvering flight. One of the input factors of the provided compound indicator is the gross weight of the craft which varies over a wide range between take-off and landing conditions due to obvious causes such as fuel consumption as well as release of disposable loads. The other variable factor taken into consideration in accordance with the present inventive concepts is the flap configuration of the craft or the equivalent flight condition designating indicia, flaps up, take off and landing depicted in the manually settable embodiment of the invention shown in the drawing.

Where the basic instrument is one providing only an air speed indication, it has heretofore been necessary for the human pilot to memorize tables or consult charts to determine the stalling speed of the craft. These processes are subject to error and require the human pilot to remember a particular speed and fly the craft with reference to it. Accordingly, in order to insure the safety of the craft with respect to a stall condition, it was normally flown at a much greater air speed than was necessary with resultant uneconomical operation. The primary object of the present invention is to obviate this condition by the inclusion of a stall warning pointer means readable on the scale element and with respect to the pointer of a basic air speed or dynamic pressure indicator for aircraft.

A further object of the invention is to provide a stall warning indicating instrument of the character described whose operations are independent of both the craft's attitude about its pitch axis and the angle of attack of the craft.

Another object of the invention resides in provision of an aircraft instrument capable of informing the human pilot as to when to pull back on the stick during a take off condition to raise the craft off the ground.

Still a further object of the present invention is to provide a compound visual warning instrument of the class described in which the movable element of the basic speed or dynamic pressure element is readable on a load factor scale to indicate to the human pilot the value "g" representing allowable acceleration units to which the human pilot may safely subject the plane at take off or during maneuvering flight conditions.

Other objects, features and structural details of the invention will be apparent from the following description when read in relation to the accompanying drawing, in which, FIG. 1 is a front elevation view showing the hereinbefore referred to mechanical embodiment of the invention in which the gross weight scale of a movable dial is set manually by the human pilot with respect to the flight condition designating indicia on the face of the indicator;

Figure 1:
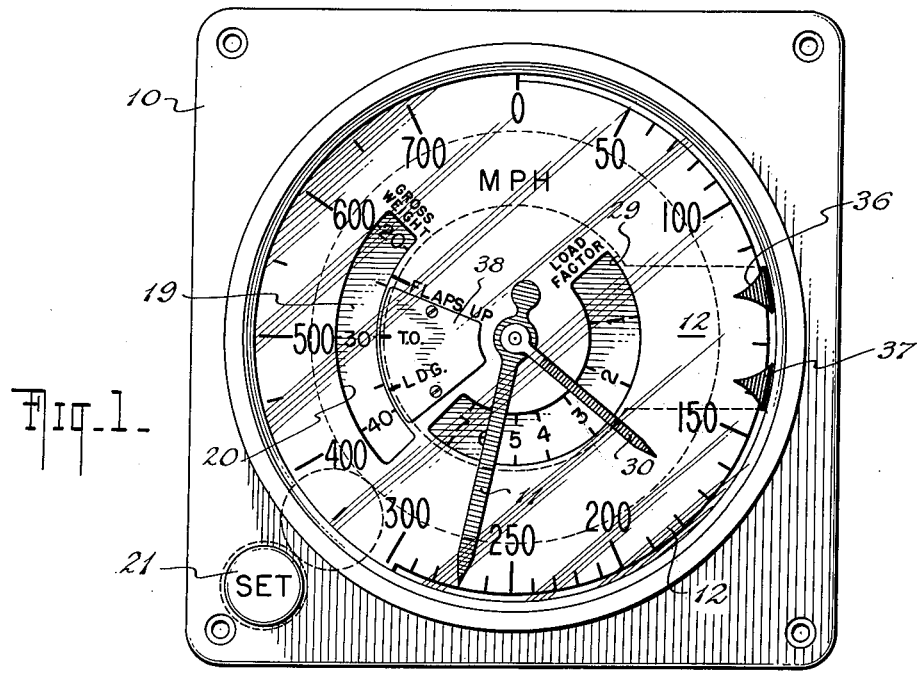
Figure 2:
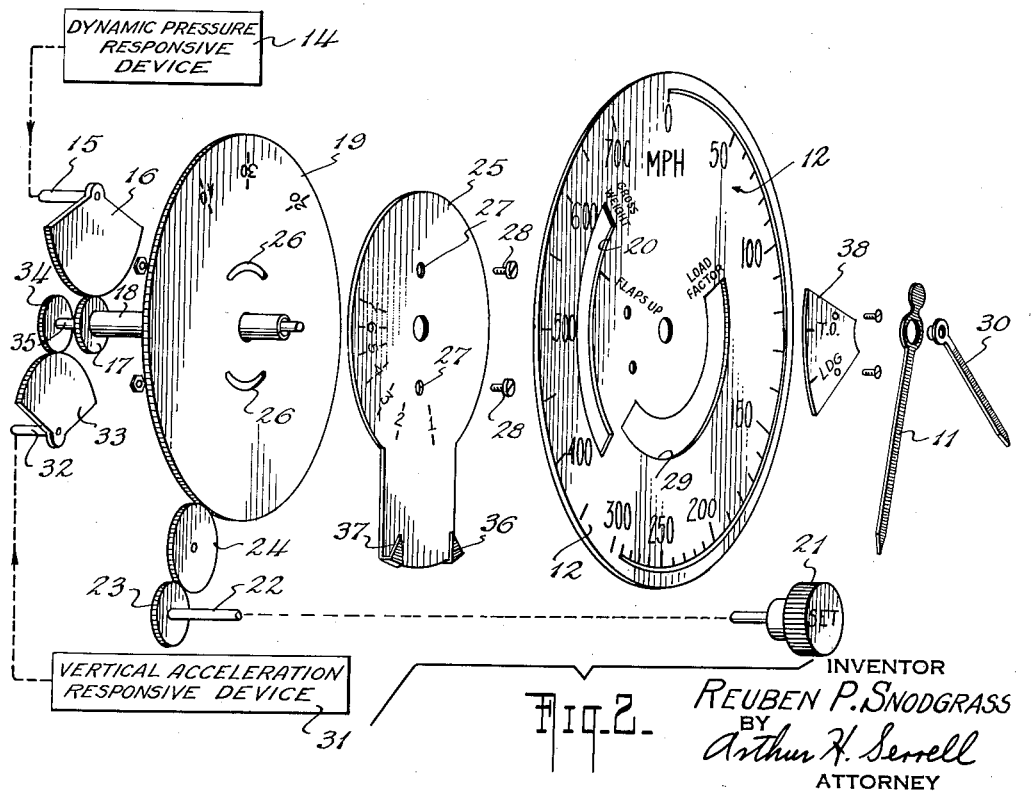
FIG. 2 is a schematic view of the components constituting the indicator shown in FIG. 1, with the dials and pointers of the same illustrated in exploded relation.

With reference to FIGS. 1 and 2, the improved indicating instrument is shown to include a suitable housing for its operating components with a mounting plate 10 by which it is located on the instrument panel of an aircraft. The basic instrument shown is a fixed scale, movable pointer, type of differential pressure gauge that as represented indicates craft air speed in miles per hour. The rotatable pointer 11 of the instrument is moved in relation to a circular dial 12 that is suitably fixed with respect to the mounting plate 10 in accordance with the air speed of the craft. The position of the pointer 11 is accordingly determined by conventional actuating means carried by the craft that is herein represented as a dynamic pressure responsive device 14. Device 14 is operatively connected to the pointer 11 by way of shafting 15, sector gear 16, meshing drive pinion 17 and tubular shafting 18, which extends through a central opening in the fixed dial 12, the pointer 11 being fixedly connected on the end of the shafting 18 in a position in front of the fixed dial. The gauge type indicator is designed so that the pointer 11 deflection is proportional to the logarithm of the pressure output of the device 14. The scale represented on the fixed dial 12 of the instrument is graduated accordingly. As shown, the basic scale on which pointer 11 is read is graduated in units of air speed in miles per hour over a range from 0 to 700. The air speed scale is located about the circumferential edge of the fixed circular dial 12 and includes radial line designations as well as numerical representations to improve the readability of the indicator. With pointer 11 positioned, as shown in FIG. 1, with relation to the air speed scale, the indicator reading shows that the craft is flying at a forward air speed of 270 miles per hour.

In the form of the invention shown in FIGS. 1 and 2, the improved indicator includes a second dial 19 that is mounted to move in relation to the fixed dial 12. In the arrangement shown in FIG. 2, dial 19 has the circular configuration of fixed dial 12 and is rotatably mounted on the tubular shaft 18. The dials 12 and 19 are accordingly mounted in concentric relation with respect to the axis of the air speed pointer 11. Dial 19 includes thereon a logarithmic gross weight scale as represented thereon by radial lines and numerical designations. The numerical values of the gross weight scale are in units of a thousand and correspond to the actual variations in gross weight attainable in flight for a particular aircraft from take off to landing. Accordingly, the depicted values are illustrative for the craft in which the improved indicator is mounted. Dial 19 constitutes a movable member that introduces the gross weight factor input to the improved indicating computer instrument. In this form of the invention, this factor as well as the flight condition factor are introduced manually by the human pilot by the proper setting of the gross weight scale with relation to the indicia on the fixed dial designated in FIG. 1 by the radial line and the term flaps up, the radial line and the abbreviation T.O. for take off, and the radial line and the abbreviation LDG. for landing. As shown, the line designations are angularly spaced along the inside edge of an arcuate slotted opening 20 in the fixed dial 12. The gross weight scale on the movable member or dial 19 of the indicator is positioned thereon so as to be readable with relation to the flight condition indicia through the opening 20 in the dial 12. The improved instrument shown in FIGS. 1 and 2 includes manually adjustable means for setting the gross weight scale of the dial or member 19 with relation to the flight condition indicia corresponding to the actual flight condition of the craft and in accordance with the gross weight of the craft. As depicted, such means includes a rotatable setting knob 21 adjustable by the human pilot with knowledge of the actual gross weight of the craft and with its flight condition, shafting 22 and driving gears 23, 24, the driving gear 24 meshing with the toothed periphery of the rotatable circular member or dial 19. The reading in FIG. 1 of this portion of the improved indicator shows that the human pilot has set the gross weight scale at a value of approximately 24,000 pounds with relation to the flaps up designated index.

The indicator shown in FIGS. 1 and 2 may further include an additional rotatable concentric dial 25 having a logarithmic load factor scale thereon with radial line and numerical designations in units representative of multiples of the acceleration of gravity "g" over a range from unity to seven. The arcuate slots 26 in dial 19, holes 27 in dial 25 and screw fastenings 28 provide a means for interconnecting the rotatable dials 19 and 25 in adjustable angular relationship. The angular adjustment is necessary in order to account for differences in the operating characteristics of the aircraft types utilizing the improved indicator. The connected dials 19 and 25 move as a unit or assembly upon actuation of the knob 21 by the human pilot. The graduated load factor scale appears on the face of the indicator through a second arcuate opening 29 in the fixed dial 12. The condition of loading of the craft is represented by the adjustable load factor scale. The scale is correlated to the speed scale of the fixed dial and is read in relation to the speed pointer 11 to indicate the value of acceleration at which a stall will occur. The reading of the indicator in FIG. 1 shows the human pilot that the craft is flying at 270 miles per hour with a maximum stalling "g" reading of approximately 6 "g's" on the adjusted load factor scale. It will be understood that the load factor scale read in relation to pointer 11 indicates the available maneuvering "g's" and not the actual "g" load on the craft.

The improved indicator may further include a second movable pointer 30 readable on the load factor scale to provide an indication of the actual condition of loading of the craft. As shown, pointer 30 is rotatably mounted and driven in accordance with the condition of loading of the craft by a means depicted in FIG. 2 as a vertical acceleration responsive device 31 by way of shafting 32, sector gear 33, drive pinion 34 and shaft 35 concentric to and extending within the tubular shaft 18. Shaft 35 extends beyond the pointer 11 and the pointer 30 is suitably mounted on the extended end thereof. The pointer 30 reading in FIG. 1 on the load factor scale shows the craft to be in a maneuver in which the present load factor is 2.6 "g's" acceleration. The human pilot is accordingly safely maneuvering the craft by the indicated angular relation between pointers 11 and 30.

The stall pointer means of the improved indicator are provided by two fixedly spaced pointers one of which as indicated at 36 indicates stalling air speed for unaccelerated conditions of flight and the other of which as indicated at 37 indicates a minimum maneuvering air speed that is higher than the stalling air speed. As shown in FIG. 2, the pointers 36 and 37 are constructed as a part of the movable member of the arrangement which in this instance is the load factor dial 25. The pointers 36 and 37 move with adjustment of the setting knob and as shown in FIG. 1 are read in relation to the air speed scale of the fixed dial 12 to indicate a stalling air speed for the craft. With the relation of the parts shown in FIG. 1, pointer 36 indicates the stalling air speed of the craft to be 120 miles per hour for unaccelerated flight and the pointer 37 indicates the minimum maneuvering air speed of the craft to be 144 miles per hour. When the aircraft is flown at a speed equal to that indicated by pointer 37, the maximum available "g" is 1.44. This value of "g" is that which would be obtained in a steady turn of 46° bank.

The instrument operates on the basis of the following equations where L is lift, $n$ is load factor, W is weight, $q$ is dynamic pressure, $CL_{max}$ is maximum lift coefficient and A is wing area. For maneuvering flight $$L = n_{max} \cdot W = q \cdot CL_{max} \cdot A$$

For straight and level flight where $n$ is equal to unity
$$L = W = q \text{ stall} \cdot CL_{max} \cdot A.$$

The following ratio is obtained by dividing the first equation by the second equation $$\frac{n_{max} \cdot W}{W} = \frac{q \cdot CL_{max} \cdot A}{q \text{ stall } CL_{max} \cdot A}$$

which in simplified terms reads $$n_{max} = \frac{q}{q \text{ stall}}$$

The equations for the logarithmic load factor and gross weight dials are as follows:

$$\log(n_{max}) = \log(q) - \log(q \text{ stall})$$

and $$\log(W) = \log(q \text{ stall}) + \log(CL_{max}) + \log(A)$$

In the last noted equation the $\log(CL_{max})$ term is a function of the flap position of the craft and the $\log(A)$ term is a constant.

As shown in FIG. 1, a gross weight term designation is included on the fixed dial 12 in a position above the scale visible through the slot 20. Similarly, a load factor term designation is included on the fixed dial 12 in a position above the scale visible through the slot 29. To set the instrument up for a given aircraft, the stalling speeds, flap position values and gross weight values are determined by flight tests. Having this data, the gross weight scale is adjusted and the dial 19 thereof is set by the knob 21 with respect to the flaps up index. The load factor dial 25 is then adjusted until the stall pointer 36 is indicating the proper stall air speed on the air speed scale of the fixed dial 12. The locking screw fastenings 28 connecting the dials 19 and 25 are then tightened to make a unitary assembly of the dials. To set the dials for the flap position configurations corresponding to the T.O. index and LDG. index, the dials 19 and 25 are rotated by the knob 21 until the stall pointer 36 is at the stall speed indicated by the data. The line indicia for each of these flight conditions for the selected gross weight value is then noted on the dial 12 or on a separate removable plate 38 that is mounted on the dial 12 by suitable screw fastenings in the construction of the indicator shown in FIGS. 1 and 2. The maneuvering stall pointer 37 of the arrangement may be constructed so as to match a load factor of 1.44. Thus, at a scale position of 144 miles per hour, the pointer 37 indicates a speed that is 1.2 times the stalling air speed of 120 miles per hour indicated by the pointer 36. The improved instrument enables the human pilot to readily observe the stalling speed of his aircraft by proper adjustment of the gross weight scale of the indicator with relation to flight condition designating indicia. The position of the pointer 11 with relation to the load factor scale also provides the human pilot with a continuous visual indication of the load factor at which stalling will occur. In the form of the invention shown in FIGS. 1 and 2, the human pilot by proper adjustment of knob 21 introduces the variable factors to the computing instrument to control the position of the stall warning pointer 36.

Figure 3:
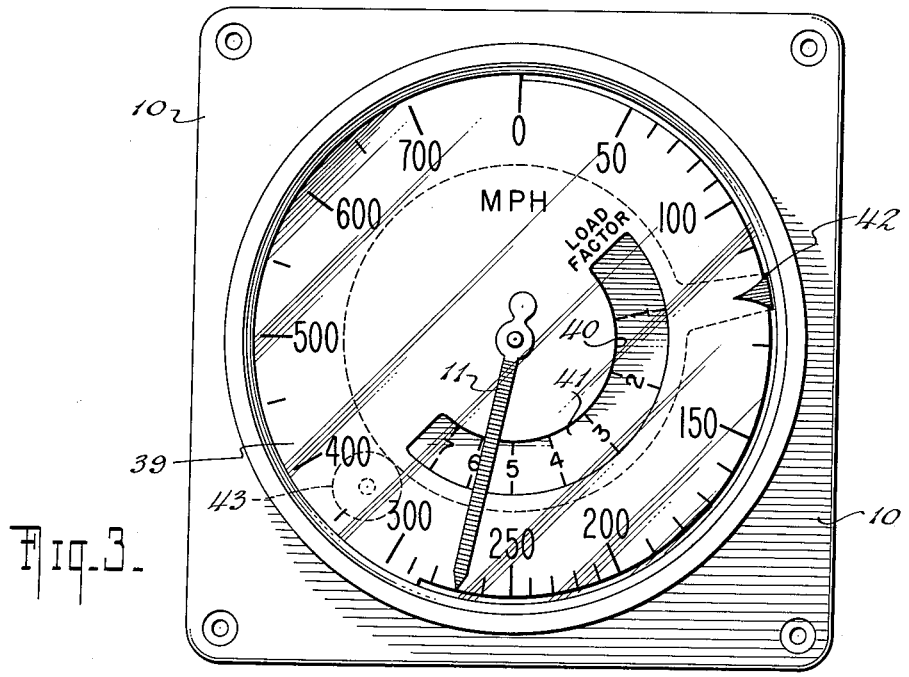
FIG. 3 is a view similar to FIG. 1, showing the face of an automatic type of improved instrument embodying the present inventive concepts.
Figure 4:
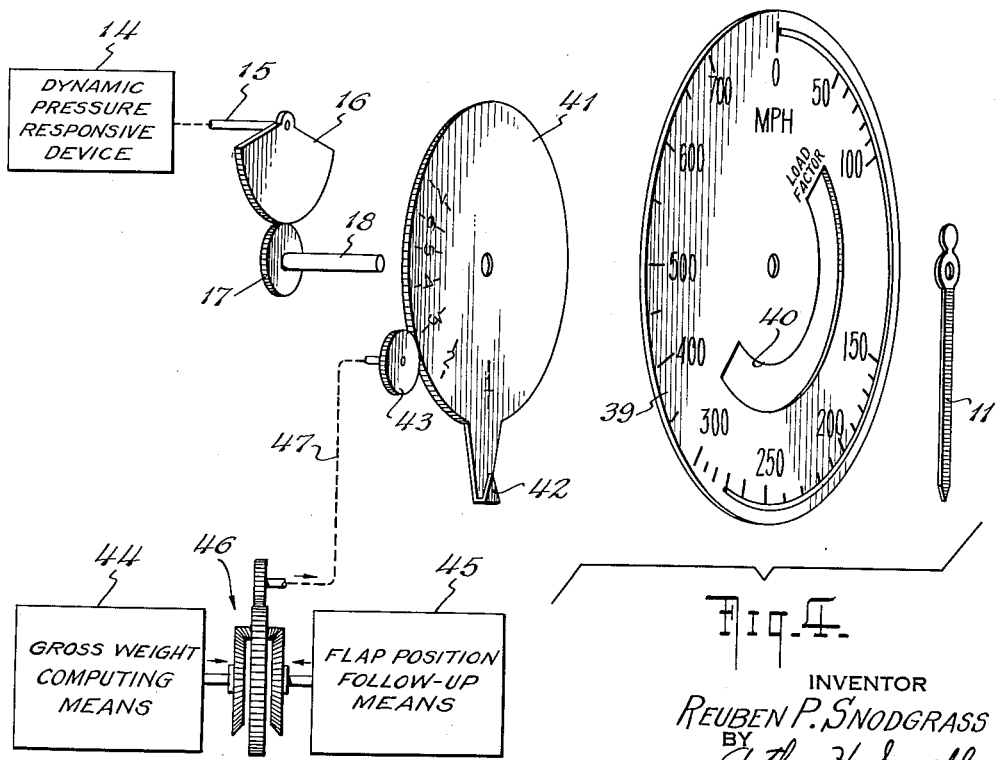
FIG. 4 is a view similar to FIG. 2 illustrating the elements constituting the instrument shown in FIG. 3 with the dials and pointer thereof depicted in exploded relation.

FIGS. 3 and 4 show an embodiment of the invention that is entirely automatic in which the knob, gross weight scale and flight condition designating indicia elements heretofore described do not appear on the face of the indicating instrument. Identical elements shown include, the instrument panel mounting plate 10, the dynamic pressure responsive device 14, shafting 15, sector gear 16, pinion 17, tubular shaft 18 and pointer 11. The fixed dial 39 shown in FIGS. 3 and 4, includes a single arcuate slotted opening 40 through which the load factor scale of a single movable member or dial 41 is visible to the human pilot. Dial 41 corresponds to the rotatable dial 25 shown in FIG. 2 and in this instance includes a single stall warning pointer 42 that is read on the air speed scale of the fixed dial 39 in the manner heretofore described in detail for stall pointer 36. The dial 41 is rotatably mounted on shafting 18 and in this form of the invention has a toothed rim that meshes with a drive pinion 43. The factors controlling the position of pointer 42 are introduced automatically in accordance with the combined outputs of a gross weight computing means 44 and a flap position follow-up means 45. As shown, the combination is effected by a differential 46 whose output shafting 47 drives the pinion 43. The output of the respective computing means 44 and follow-up means 45 provide the required inputs to the differential 46. The computing means 44 automatically introduces the changing gross weight factor input to the movable member 41 of the indicator. Also, as the human pilot changes the position of the flaps of the craft, the flap position follow-up means responds accordingly to introduce the adjustment factor corresponding to the flight condition indicia of FIG. 1 to the movable member 41. The initial setting of the member 41 and the relative ranges of the two controlling inputs thereto are determined with reference to the flight test data taken for the craft in which the instrument is to be used. The stall pointer 42, in FIG. 2, read with reference to the air speed scale of the fixed dial 39 indicates the lowest speed to the human pilot that the craft may be safely flown at. The pointer 11 with reference to the load factor scale on FIG. 3 indicates available "g's" to the human pilot as heretofore described in connection with the form of the invention shown in FIGS. 1 and 2.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A compound indicating instrument for aircraft including a housing, a dial fixedly mounted in the housing having a graduated air speed scale and a flight condition index thereon; a second dial movably mounted in the housing having a graduated gross weight scale thereon readable on the index of the fixed dial, a graduated acceleration load factor scale thereon, and a pointer readable on the air speed scale of the fixed dial; manually adjustable means on said housing for setting the gross weight scale of the movable dial with relation to the flight condition index to position said acceleration load factor scale with relation to the fixed dial and pointer with relation to the air speed scale to indicate a stalling air speed for the craft, a second pointer mounted in said housing for movement in accordance with the air speed of the craft readable on the air speed scale of said fixed dial and readable on the positioned acceleration load factor scale of said movble dial to indicate the acceleration loading available to the craft, and a third pointer mounted in the housing for movement in accordance with the influence of vertical acceleration on the craft also readable on the positioned acceleration load factor scale of said movable dial.

2. A compound indicating instrument for aircraft including a housing; a dial fixedly mounted in the housing having two slotted openings therein, a graduated air speed scale and a flight condition index thereon; a second dial movably mounted in the housing having a graduated gross weight scale thereon readable on the index of the fixed dial through one of the slotted openings therein, a graduated acceleration load factor scale visible through the other of the slotted openings in the fixed dial, and a pointer readable on the air speed scale of the fixed dial; manually adjustable means on said housing for setting the gross weight scale of the movable dial with relation to the flight condition index to position the acceleration load factor scale with relation to the other slotted opening in the fixed dial and pointer with relation to the air speed scale to indicate a stalling air speed for the craft, a second pointer mounted in said housing for movement in accordance with the air speed of the craft readable on the air speed scale of said fixed dial and readable on the load factor scale at the other slotted opening in the fixed dial to indicate the acceleration loading available to the craft, and a third pointer mounted in the housing for movement in accordance with the influence of vertical acceleration on the craft readable on the acceleration load factor scale at the other slotted opening in the fixed dial.

3. In an aircraft instrument of the class described, a housing, a dial fixedly mounted in the housing having two slotted openings therein and a flight condition index thereon; a second dial movably mounted in the housing having a graduated gross weight scale thereon readable on the index of the fixed dial through one of the slotted openings therein, and a graduated acceleration load factor scale visible through the other of the slotted openings in the fixed dial; manually settable means on said housing for setting the gross weight scale of the movable dial with relation to the flight condition index to position the acceleration load factor scale with relation to the other slotted opening in the fixed dial, and a pointer mounted in said housing for movement in accordance with the air speed of the craft readable on the load factor scale at the other slotted opening in the fixed dial to indicate the acceleration loading available to the craft.

4. In an aircraft instrument of the class described, a housing, a dial fixedly mounted in the housing having a slotted opening therein, and a graduated air speed scale thereon, a second dial movably mounted in the housing having a graduated acceleration load factor scale thereon correlated to the air speed scale and visible through the slotted opening in the fixed dial, manually adjustable means for positioning said movable scale in relation to the fixed scale in accordance with the gross weight and flight condition of the craft, and a pointer mounted in the housing for movement in accordance with the air speed of the craft readable on the air speed scale of the fixed dial and readable on the positioned load factor scale at the slotted opening in the fixed dial to indicate the acceleration loading available to the craft.

5. In an aircraft instrument of the class described, a housing, a dial fixedly mounted in the housing having an air speed scale and flight condition index thereon, a second dial movably mounted in the housing having a graduated gross weight scale thereon readable on the index of the fixed dial and a graduated acceleration load factor scale correlated to the air speed scale, means for setting the gross weight scale of the movable dial with relation to the flight condition index to position the acceleration load factor scale with relation to the air speed scale, and a pointer mounted in said housing for movement in accordance with the air speed of the craft readable on the air speed scale of the fixed dial and readable on the positioned acceleration load factor scale of the movable dial to indicate the acceleration loading available to the craft.

6. In an aircraft instrument of the class described, a housing having a fixed dial with a graduated speed scale thereon, a second dial movably mounted in the housing having a graduated acceleration load factor scale thereon correlated to the speed scale, means for positioning said movable scale with relation to the fixed scale for different flight conditions in accordance with the gross weight of the craft, a pointer mounted for movement in the housing with relation to both dials readable on the speed scale of the fixed dial to indicate the speed of the craft and readable on the positioned acceleration load factor scale of the movable dial to indicate the acceleration loading available to the craft, and means for moving said pointer in accordance with the speed of the craft.

7. In an aircraft instrument of the class described, a housing having a fixed dial with a graduated speed scale thereon, a second dial movably mounted in the housing having a graduated acceleration load factor scale thereon, gross weight computing means providing an output, flap position follow-up means providing an output, means for positioning said movable dial with relation to the fixed dial in accordance with the combined outputs of said computing and follow-up means, a pointer mounted for movement in the housing with relation to both dials readable on the speed scale of the fixed dial to indicate the speed of the craft and readable on the acceleration load factor scale of the movable dial to indicate the acceleration loading available to the craft, and means for moving said pointer in accordance with the output of a dynamic pressure responsive device carried by the craft.

8. In an aircraft instrument of the class described, a housing having a fixed dial with a graduated speed scale thereon, a second dial movably mounted in the housing having a graduated acceleration load factor scale thereon, gross weight computing means providing an output, flap position follow-up means providing an output, means for moving said movable dial operable in accordance with the combined outputs of said computing means and follow-up means to position the acceleration load factor scale of the movable dial with relation to the speed scale of the fixed dial, and a pointer movably mounted in said housing readable on the speed scale of the fixed dial to indicate the speed of the craft and readable on the acceleration load factor scale of the movable dial to indicate the acceleration loading available to the craft.

References Cited in the file of this patent

UNITED STATES PATENTS

| | | |
|---|---|---|
| 2,349,982 | Waller | May 30, 1944 |
| 2,452,621 | Weissenbach | Nov. 2, 1948 |
| 2,538,303 | Findley | Jan. 16, 1951 |
| 2,579,902 | Cabonara et al. | Dec. 25, 1951 |
| 2,682,768 | White | July 6, 1954 |
| 2,710,389 | Bayne | June 7, 1955 |
| 2,832,200 | Logie | Apr. 29, 1958 |